US007917089B2

(12) United States Patent
Zheng et al.

(10) Patent No.: US 7,917,089 B2
(45) **Date of Patent: *Mar. 29, 2011**

(54) SYSTEM AND METHOD FOR MANAGING WIRELESS CONNECTIONS IN COMPUTER

(75) Inventors: Jianyu Roy Zheng, San Diego, CA (US); Mark Allen Hanson, San Jose, CA (US); Djung Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/644,269

(22) Filed: Dec. 22, 2009

(65) Prior Publication Data

US 2010/0100642 A1 Apr. 22, 2010

Related U.S. Application Data

(63) Continuation of application No. 11/041,833, filed on Jan. 24, 2005, now Pat. No. 7,668,508.

(60) Provisional application No. 60/627,422, filed on Nov. 12, 2004.

(51) Int. Cl.
*H04B 7/00* (2006.01)

(52) U.S. Cl. ................ 455/41.2; 455/552.1; 455/553.1; 455/557; 455/420

(58) Field of Classification Search ................ 455/41.2, 455/423, 420, 553.1, 566, 419, 552.1, 557, 455/418; 345/689, 650, 204, 205
See application file for complete search history.

(56) References Cited

U.S. PATENT DOCUMENTS

| | | | | |
|---|---|---|---|---|
| 6,282,491 | B1 * | 8/2001 | Bochmann et al. | 701/209 |
| 6,665,521 | B1 * | 12/2003 | Gorday et al. | 455/67.11 |
| 6,694,143 | B1 * | 2/2004 | Beamish et al. | 455/456.1 |
| 6,741,853 | B1 * | 5/2004 | Jiang et al. | 455/418 |
| 6,748,195 | B1 * | 6/2004 | Phillips | 455/41.2 |
| 6,954,656 | B2 * | 10/2005 | Watanabe | 455/566 |
| 6,996,423 | B2 * | 2/2006 | Kitajima et al. | 455/566 |
| 6,999,721 | B2 * | 2/2006 | Ollis et al. | 455/41.2 |
| 7,155,167 | B1 * | 12/2006 | Carty | 455/67.11 |
| 2002/0037718 | A1 * | 3/2002 | Watanabe | 455/423 |
| 2002/0097692 | A1 * | 7/2002 | Ruotoistenmaki | 370/328 |
| 2003/0109273 | A1 * | 6/2003 | Ono et al. | 455/517 |
| 2003/0134629 | A1 * | 7/2003 | Ollis et al. | 455/419 |
| 2004/0110530 | A1 * | 6/2004 | Alone et al. | 455/552.1 |
| 2004/0174853 | A1 * | 9/2004 | Saito et al. | 370/338 |
| 2005/0005109 | A1 * | 1/2005 | Castaldi et al. | 713/165 |
| 2005/0026648 | A1 * | 2/2005 | Belkin et al. | 455/552.1 |
| 2005/0073521 | A1 * | 4/2005 | Watanabe et al. | 345/440 |
| 2005/0075093 | A1 * | 4/2005 | Lei et al. | 455/412.1 |
| 2005/0113062 | A1 * | 5/2005 | Pelaez et al. | 455/405 |
| 2005/0114825 | A1 * | 5/2005 | Leung et al. | 717/100 |
| 2005/0153736 | A1 * | 7/2005 | Ganton | 455/553.1 |
| 2005/0159173 | A1 * | 7/2005 | Dowling | 455/456.3 |

(Continued)

*Primary Examiner* — Dominic E Rego
(74) *Attorney, Agent, or Firm* — John L. Rogitz

(57) ABSTRACT

A Wireless Connection Utility (WCU) provides a unified user experience for managing various types of wireless connections, including Wireless WANs, Wireless LANs, and Bluetooth networks. The WCU functions as a gateway for a user of a computer to monitor the computer's wireless network status, to switch wireless connections, to configure wireless connection settings, and to diagnose wireless connection problems through a Wireless Helper Utility (WHU). The WCU thus provides a unified U/I layer on the top of the existing operating system components for ease of use.

12 Claims, 5 Drawing Sheets

U.S. PATENT DOCUMENTS

2005/0221858 A1* 10/2005 Hoddie ........................ 455/557
2005/0238046 A1* 10/2005 Hassan et al. ................ 370/465
2005/0260996 A1* 11/2005 Groenendaal ................ 455/445
2005/0266889 A1* 12/2005 Kuhl et al. .................... 455/564
2005/0267943 A1* 12/2005 Castaldi et al. .............. 709/206
2006/0006231 A1* 1/2006 Anson et al. ................. 235/435
2006/0020589 A1* 1/2006 Wu et al. ......................... 707/3
2006/0028398 A1* 2/2006 Willmore ...................... 345/2.3
2006/0058013 A1* 3/2006 Bocking et al. .............. 455/418
2006/0073788 A1* 4/2006 Halkka et al. ................ 455/41.2
2006/0075075 A1* 4/2006 Malinen et al. .............. 709/220
2006/0094448 A1* 5/2006 Ollis et al. ................. 455/456.3
2006/0105713 A1* 5/2006 Zheng et al. ................ 455/41.2
2006/0111139 A1* 5/2006 Kitajima et al. ........... 455/550.1
2006/0116164 A1* 6/2006 Kang ........................... 455/557
2006/0148512 A1* 7/2006 Ekholm et al. ............. 455/550.1
2006/0183477 A1* 8/2006 Bocking et al. ............ 455/435.2
2006/0264227 A1* 11/2006 Takahashi et al. ........... 455/513
2006/0267936 A1* 11/2006 Hoerl et al. .................. 345/158
2007/0032267 A1* 2/2007 Haitani et al. ............. 455/556.2
2007/0087766 A1* 4/2007 Hardy et al. .................. 455/466
2007/0091845 A1* 4/2007 Brideglall ..................... 370/331
2007/0180382 A1* 8/2007 Kortum et al. ................ 715/716
2008/0052384 A1* 2/2008 Marl et al. .................... 709/223
2009/0054068 A1* 2/2009 Halkka et al. ................ 455/445
2009/0119008 A1* 5/2009 Kobuya et al. ................ 701/208

* cited by examiner

*Fig. 3*
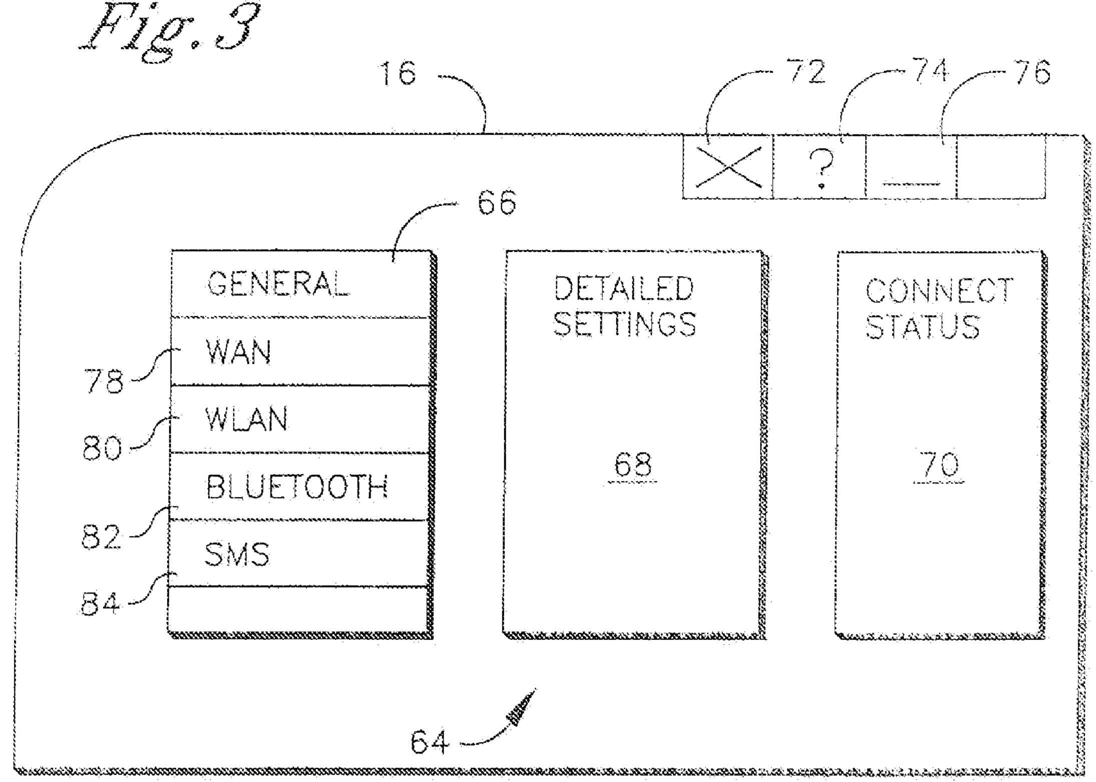
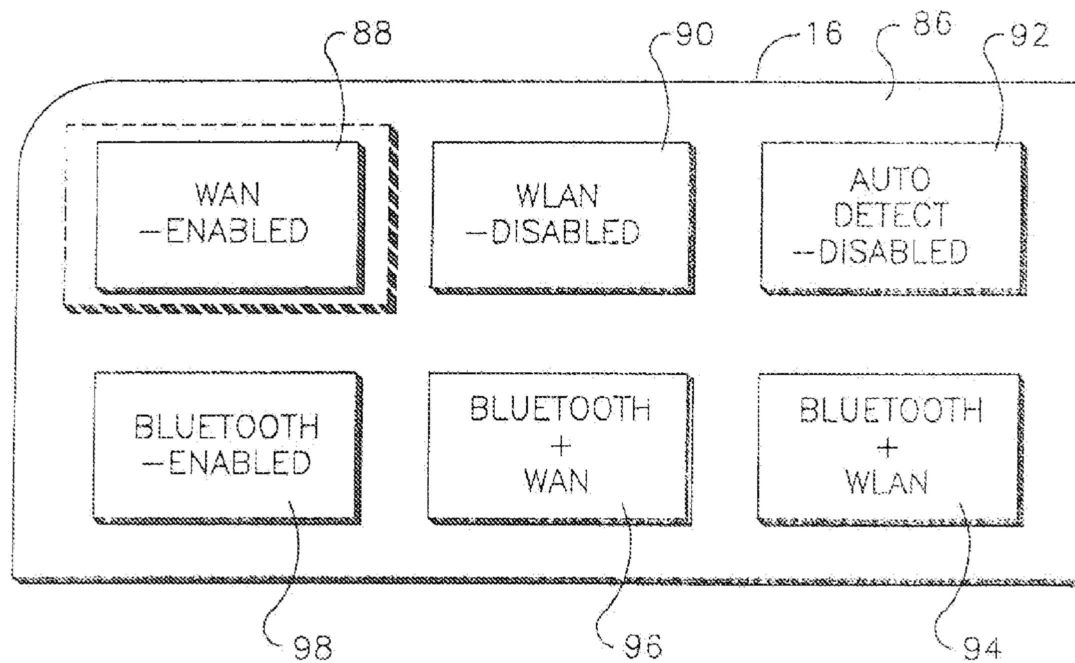
*Fig. 4*

116
START
118
USER SWITCHES TO AUTO-DETECT
120
WCU READS GENERAL PREFERENCE
124
WCU ENABLES WLAN
WLAN
122
PRIORITY ?
WAN
138
WCU ENABLES WAN
126
CONNECTED ?
YES
140
CONNECTED ?
NO
130
WCU DISABLES WLAN WCU ENABLES WAN
NO
142
WCU DISABLES WAN WCU ENABLES WLAN
132
CONNECTED ?
YES
128
END
YES
144
CONNECTED ?
NO
134
LAUNCH WIRELESS HELPER UTILITY
NO
136
TUTORIAL, DIAGNOSIS

SYSTEM AND METHOD FOR MANAGING WIRELESS CONNECTIONS IN COMPUTER

RELATED APPLICATIONS

This is a continuation of and claims priority to U.S. patent application Ser. No. 11/041,833, filed Jan. 24, 2005 now U.S. Pat. No. 7,668,508, which in turn claims priority from U.S. provisional patent application Ser. No. 60/627,422, filed Nov. 12, 2004, incorporated herein by reference.

I. FIELD OF THE INVENTION

The present invention relates generally to user interfaces for managing wireless connections in computers such as laptop computers.

II. BACKGROUND OF THE INVENTION

Many computers, particularly portable computers such as laptop computers like Sony's VAIO®, can communicate wirelessly with one or more networks. For instance, a laptop computer may be capable of wirelessly communicating with a wide area network (WAN), wireless local area network (WLAN), a Bluetooth network, a short message service (SMS) network, and so on.

As critically recognized herein, each of the above networks typically has its own user interface (U/I) that a user must invoke to enable the particular communication channel or otherwise communicate over the associated network. For instance, a utility known as Windows Zero Configure (WZC) provides a U/I for communicating over WLAN, while another utility known as Windows Bluetooth Manager can be used for Bluetooth communication. Various familiar trademarked terms such as "Windows" may be used herein for convenience.

As further recognized herein, the various U/I of the wireless networks that are available on a computer are not integrated, meaning that a user wishing to switch from one network to another must access the different utilities associated with each network and operate each one to, e.g., configure system settings of a network, change which network is being used, etc. With this recognition in mind, the present invention is provided.

SUMMARY OF THE INVENTION

A Wireless Connection Utility (WCU) provides a unified user experience for managing various types of wireless connections, including Wireless WANs, Wireless LANs, and Bluetooth networks. The WCU functions as a gateway for a user of a computer to monitor the computer's wireless network status, to switch wireless connections, to configure wireless connection settings, and to diagnose wireless connection problems through a Wireless Helper Utility (WHU). The WCU does not replace existing operating system components such as Windows Zero Configure (WZC) and Windows Bluetooth Manager, but instead provides a U/I layer on the top of the existing operating system components and in some implementations with added features not supported by the operating system components, such as a one-button connection switcher, a wireless WAN connection manager, some additional WLAN configuration choices, "Hotspot" promotion, and a unified user interface for ease of use.

Accordingly, a computer executes a wireless connection utility (WCU) embodying logic that includes accessing at least two of the following: a wireless local area network (WLAN) driver, a wide area network (WAN) driver, and a Bluetooth driver. The logic also includes displaying a unified user interface (U/I) which presents, in a single screen display, images that represent at least two networks selected from the above networks. A user is enabled to use the U/I to select one or more networks with which to communicate.

In some embodiments the U/I can include a main U/I screen display that presents at least two of the following: a WAN button selectable to cause WAN settings to appear in a settings window of the main screen display, a WLAN button selectable to cause WLAN settings to appear in the settings window, and a Bluetooth button selectable to cause Bluetooth settings to appear in the settings window. It is preferred that all three buttons are presented on the main U/I screen display. Also, a general button can be presented on the main U/I screen display. The general button can be selected to enable a user to select whether to launch the WCU when an operating system of the computer starts up. Also, the general button can be selected to enable a user to select which of a WLAN or a WAN will have automatic detection priority.

In addition to the main U/I screen, the U/I can include a one-touch screen display presenting a WAN button selectable to switch communications to a WAN, a WLAN button selectable to switch communications to a WLAN, and a Bluetooth button selectable to switch communications to a Bluetooth network. Also, buttons for selecting WAN+Bluetooth and WLAN+Bluetooth can be provided on the one-touch screen. One press of a single "hot" key such as "F1" or one simultaneous press of a combination of "hot" keys such as, e.g., "function" and "F1".

In another aspect, a computer program product bears instructions that are executable by a digital processor associated with at least two wireless communication networks selected from a WAN, a WLAN, and a Bluetooth network. Means are provided for causing a main U/I to appear on a screen associated with the digital processor. The main U/I presents, in a single screen display, computer display elements representing a WLAN, a WAN, and a Bluetooth communication system. The main U/I also presents a settings window displaying settings associated with at least one of the computer display elements.

In still another aspect, a user interface for a computer having wireless communication capability includes at least one screen display that displays a WAN computer display element, a WLAN computer display element, and a Bluetooth computer display element. A computer display element may be selected to cause at least one of the following: settings associated with a network represented by the computer display element are displayed in a settings window of the U/I, and communication is automatically switched to a network represented by the computer display element.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 shows the main U/I display screen;

FIG. 4 shows the one-touch select display screen;

DETAILED DESCRIPTION OF THE PREFERRED EMBODIMENT

Figure 1:
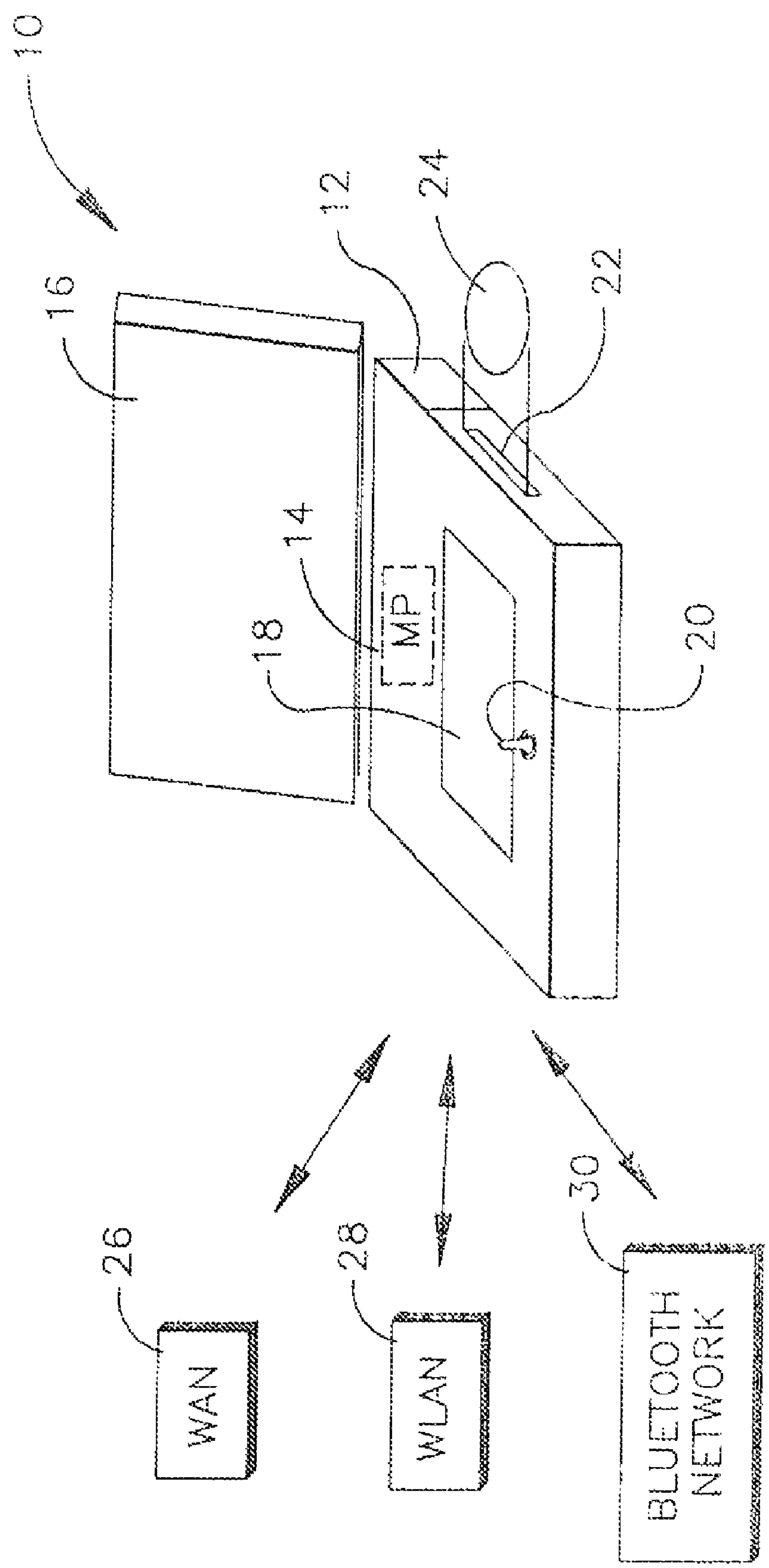
FIG. 1 is a perspective view of one non-limiting computer that can use the present wireless communication utility (WCU)

Referring initially to FIG. 1, a system is shown, generally designated 10, that includes a computer 12 such as a Sony VAIO laptop computer having a digital processor 14, a computer monitor or display screen 16, and various input devices such as a keypad or keyboard 18 and joystick 20 and/or other pointing and clicking device such as a mouse or touchpad. The computer 12 may also have various internal memory devices such as hard disk drives, solid state memory, etc. as well as an optical disk drive 22 for receiving an optical disk 24 therein. These various memories including the disk 24 are non-limiting examples of computer program products that can hold instructions embodying the present wireless communication utility (WCU) set forth further below.

In accordance with principles known in the art, the computer 12 may wirelessly communicate with other computers and users through plural wireless communication networks, including a wide area network (WAN) 26, a wireless local area network (WLAN) 28, and a Bluetooth network 30. To this end, the computer 12 includes appropriate wireless communication systems in accordance with principles known in the art.

Figure 2:
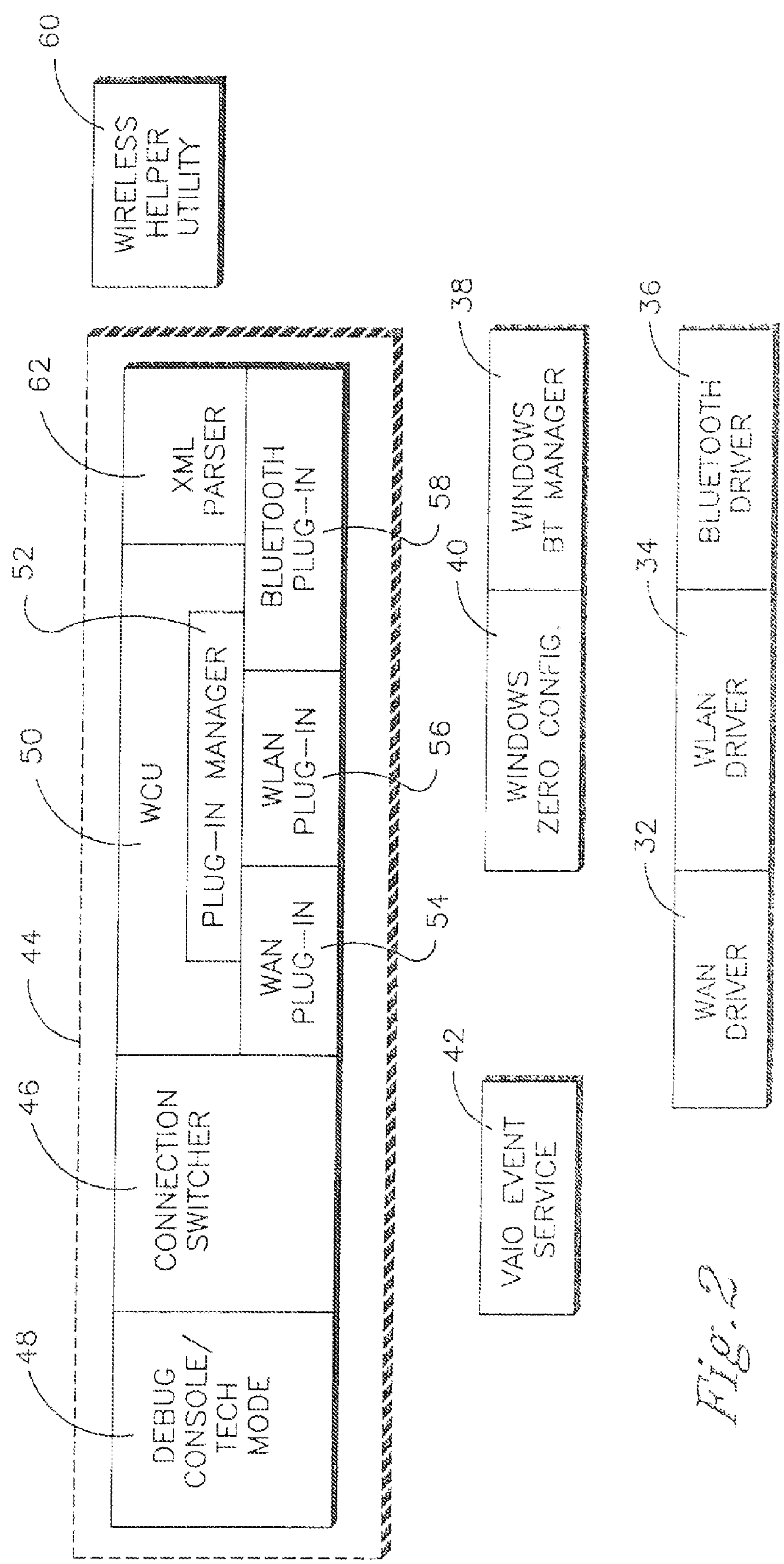
FIG. 2 is a block diagram showing the WCU in operable engagement with other components of the computer shown in FIG. 1.

FIG. 2 shows the overall software architecture of the present invention. Turning first to those components that are conventional, the computer 12 may access a WAN driver 32 that provides low level WAN functionalities, a WLAN driver 34 that provides low level WLAN functionalities, and a Bluetooth driver 36 that provides low level Bluetooth functionalities. The drivers 32, 34, 36 are respectively configured for facilitating communication over the networks 26, 28, 30 shown in FIG. 1. Operating system (such as Windows) components may be above the drivers as shown in FIG. 2, and these components may include a Bluetooth manager 38 for facilitating configuration of Bluetooth settings and a Windows Zero Configuration (WZC) component 40 for facilitating WLAN communication by, e.g., providing configuration establishment capabilities for WLAN settings. When the computer 12 is a Sony VAIO computer, a VAIO Event Service component 42 may also be provided.

On top of the afore-mentioned conventional software components and communicating therewith is a WCU 44 of the present invention. As shown in FIG. 2, the WCU 44 may include a connection switcher 46, which may be implemented by an applet that allows a user to quickly switch wireless connections by key operations (e.g., using a programmable button, a function key or keys, arrow keys, etc.) The U/I associated with the connection switcher 46 is described further below in reference to FIG. 4.

In some embodiments a debug console/tech mode component 48 may be provided to allow debugging with a low level command mode (e.g. for Field Test purposes. This mode may be hidden from the end user, who should not require it.

Additionally, the WCU 44 includes a WCU Main entry point module 50 that, among other things, can generate the main U/I shown in FIG. 3 and described further below. The main module 50 may include or access a plug-in manager 52 for interfacing with different types of wireless plug-in components, including, e.g., a WAN plug-in 54, a WLAN plug-in 56, and a Bluetooth plug-in 58, which communicate with the respective network conventional components 32, 34/40, and 36/38. The plug-ins 54-58 gather, from their drivers, status information that may be formatted in XML for subsequent display of the status of their respective networks in the main U/I described further below. U/I components may be dynamically loaded according to the availability of the plug-ins 54-58. The plug-in manager 52 provides a list of functions that may include, e.g., loading connection plug-ins, enumerating connection plug-ins, providing an interface for obtaining connection properties, and providing an interface for inter-plug-in communication.

In accordance with further disclosure below of FIG. 3, in addition to gathering WAN status information, the WAN plug-in 54 allows a user to configure WAN settings when in the main U/I of FIG. 3. Likewise, the WLAN plug-in 56 allows a user to configure WLAN settings from the main U/I, while the Bluetooth plug-in 58 allows a user to configure Bluetooth settings. If desired, a Wireless Helper Utility (WHU) 60 may be provided to provide tutorial, dynamic help, and diagnosis functionalities to assist the user to use, configure, and troubleshoot a wireless connection. Also, an XML parser 62 may be implemented in the WCU 44 to parse XML files in accordance with disclosure below, and specifically to parse XML files associated with each plug-in 54-58 for establishing the U/I layouts depicted in FIGS. 3 and 4. More specifically, the XML parser 62 interprets the XML file of each connection plug-in 54-58, which describes the types of settings and their customized layout on the Main U/I shown in FIG. 3 below. Thus, each connection plug-in 54-58 provides its own XML file and also the corresponding event handler. In any case, it may now be appreciated that the WCU 44 provides a unified U/I layer.

Now referring to FIG. 3, a main U/I screen display 64 is shown that can be presented on the monitor 16 of the computer 12. As shown, the main U/I 64 includes plural general computer display elements such as buttons that are selectable by a user to establish communication settings and execute other communication tasks as set forth further herein. The buttons may include a general button 66 which, when selected, causes general settings to be displayed in a settings window 68 of the main U/I 64. Among the general settings, which do not depend on a particular type of connection, may be the following:

- Launch WCU on Windows startup, which if selected adds a WCU 44 executable to the operating system registry so it will run whenever Windows log on: this will not display the task tray icon described further below if the wireless switch of the computer 12 (if one is provided) is off;
- Launch WCU when turning on wireless switch;
- Open WCU main window when turning on wireless switch, which if selected launches the WCU 44 when the user turns on the wireless switch;
- Always on top, which if selected causes the WCU 44 to stay on top of the desktop directory; and
- Auto Detect Priority, which if selected determines which connection has the highest connection priority in accordance with logic below.

A connection status window 70 may also be included in the main U/I 64 to display the status of the connection associated with the selected button on the left of the display. Also, various task icons can be provided, e.g., an exit icon 72, a help-invoking icon 74 that invokes the WHU 60, a minimize icon 76, and so on. The WCU 44 may also display, in the computer's system task tray, various icons indicating whether and what wireless communication systems are enabled, which, when clicked on by a user, can cause a menu to appear to facilitate enabling and disabling various systems.

Returning to the various buttons in the main U/I 64, a WAN button 78 may be selected to display WAN settings in the settings window 68 and to display WAN status in the status window 70 as derived from XML information parsed from signals from the WAN plug-in 54. In some implementations the status window can appear as part of an expanded selected button.

The WAN status items may include the WAN carrier name, the name of the carrier of the current network and roaming status (e.g., "unavailable", "unregistered", "searching", "carrier 1 (home)", "carrier 2 (roam)", etc.), and the type of network ("mode", e.g., "disconnected", "GSM", "SPRS/Edge", etc.). Furthermore, the status window when the WAN button 78 is selected may include connection speed in bytes per second, number of bytes sent and received, duration of connection, and wireless signal strength for the connection.

On the other hand, when the WAN button 78 is selected, the following settings may appear in the settings window 68 for the user to review and modify: "connection status", which is a switch for WAN module power on/off (Enable/Disable); "network", which shows any available network operators that are carrier-specific; "profile", which shows the carrier network APN (also carrier-specific); "roaming", which can be used to select whether to allow roaming (e.g., "always", "never", "prompt first"); "VPN", which can be used to launch a virtual private network (VPN) client when connected; "usage summary" which shows a monthly data count for billing purposes; "config IP/DNS", which allows a user to set static IP/DNS for advanced uses, and "advanced", which may be reserved for advanced settings such as establishing IP addresses, updating fireware, etc.

It may be mentioned here that a network connection enables the computer 12 to connect to a WAN such as a GSM network, while data connection happens after the computer 12 is connected to the WAN. Data connection explicitly establishes TCP/IP sessions to connect to the Internet. Non-TCP/IP functionalities, such as short message services (SMS), can work with a network connection only. If the system 10 supports data usage only, there is no need to separate network connection from data connection. Powering on enables network and data connections directly.

FIG. 3 also shows that a WLAN button 80 may be provided. When it is selected, the status that is displayed may include, e.g., "mode" (type or band of WLAN, such as 802.11), "network" information, such as SSID, "data rate", "duration", and "signal strength". The settings that are related to WLAN and that may displayed when the WLAN button 80 is selected can include, e.g., "status" (whether the WLAN module is on or off); "mode" (indicating WLAN frequency mode, e.g., 802.11a, 802.11g, 802.11b/g); "configured profiles", which is a list of SSIDs that indicate WLAN profiles that are pre-configured or that the user has previously configured; and "configure profiles", which when selected launches the WZC 40 shown in FIG. 2 to add or edit profiles/SSID.

A Bluetooth button 82 may also be provided which, when selected, can cause the following status items to be displayed: device name, and MAC address. The settings associated with the Bluetooth button 82 may include status, connected devices (Bluetooth device names that are wirelessly connected to the computer 12), and "configure Bluetooth device", which launches the Bluetooth manager 38 shown in FIG. 2 to enable the user to configure the Bluetooth device associated with the computer 12.

Additionally, a SMS button 84 can be provided as shown in FIG. 3. When it is selected, a SMS application is launched by selecting, in the settings window 68, "enable". The data connection, network, and carrier APN may also be displayed. In this way, if the computer 12 has a SMS, it can be integrated with the WCU 44 to send and receiver short messages and to save them if desired to a SIM card or other data storage device.

Now referring to FIG. 4, as mentioned above a one-touch screen display 86 can be provided to bring ease of use to users by allowing them to switch from one wireless connection (e.g., WAN) to another (e.g., WLAN) by keyboard-only operation. For instance, a programmable button, function key, arrow key, system task bar icon, or enter key can be used to activate the connection switcher 46 shown in FIG. 2 and thereby cause the display 86 shown in FIG. 4 to be displayed on the monitor 16, with a single button stroke being sufficient to cause communication to switch from, e.g., WAN-only to, e.g., WLAN plus Bluetooth. By "one touch" is meant not only the selection of a single button once to switch connections, but also the simultaneous manipulation of plural "hot" keys, such as, e.g., "function" and "F1".

For instance, in the specific non-limiting embodiment shown, the display shown in FIG. 4 includes a WAN-only select element 88, which, as indicated by the dashed line, has been selected by the user to switch communication to the WAN. A WLAN select element 90 can alternatively be selected to enable only a WLAN connection, and an auto detect selector element 92 may be used to enable auto detection of available connections to establish the predetermined connection having the highest priority as discussed above. Or, a Bluetooth plus WLAN selector element 94 may be used to enable both Bluetooth and WLAN communication, or a Bluetooth plus WAN selector element 96 may be used to enable both Bluetooth and WAN communication. Bluetooth only may be enabled by selecting a Bluetooth button 98. To move the cursor or dashed line over another selector element, the predetermined key is pressed again, and/or navigation around the display 86 may be effected by using the arrows on the computer 12 keyboard. Selection of the computer's enter key can cause the associated selection to be made immediately. The computer's escape key can be selected to effect no selection change and to hide connection switcher select elements.

Figure 5:
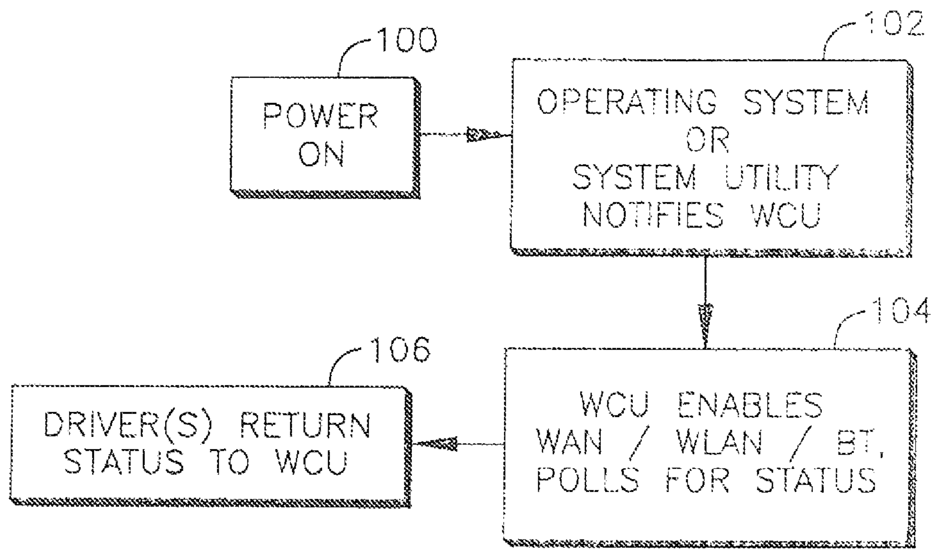
FIG. 5 is a flow chart of the power on logic.
Figure 6:
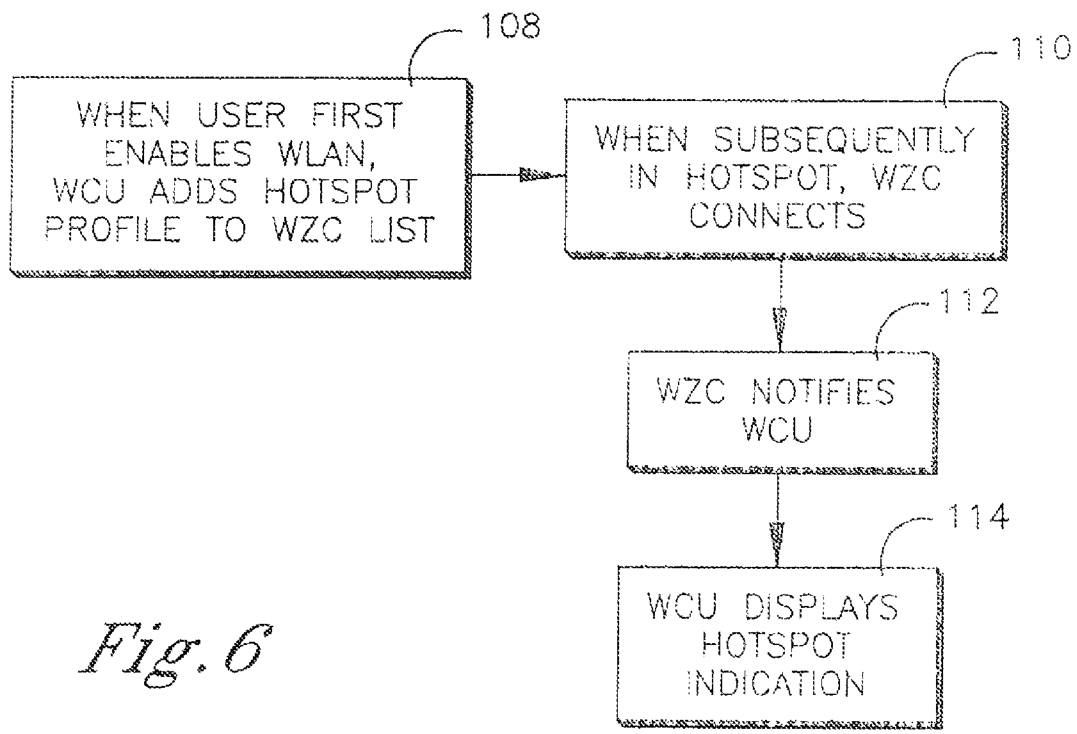
FIG. 6 is a flow chart of the hotspot logic.
Figure 7:
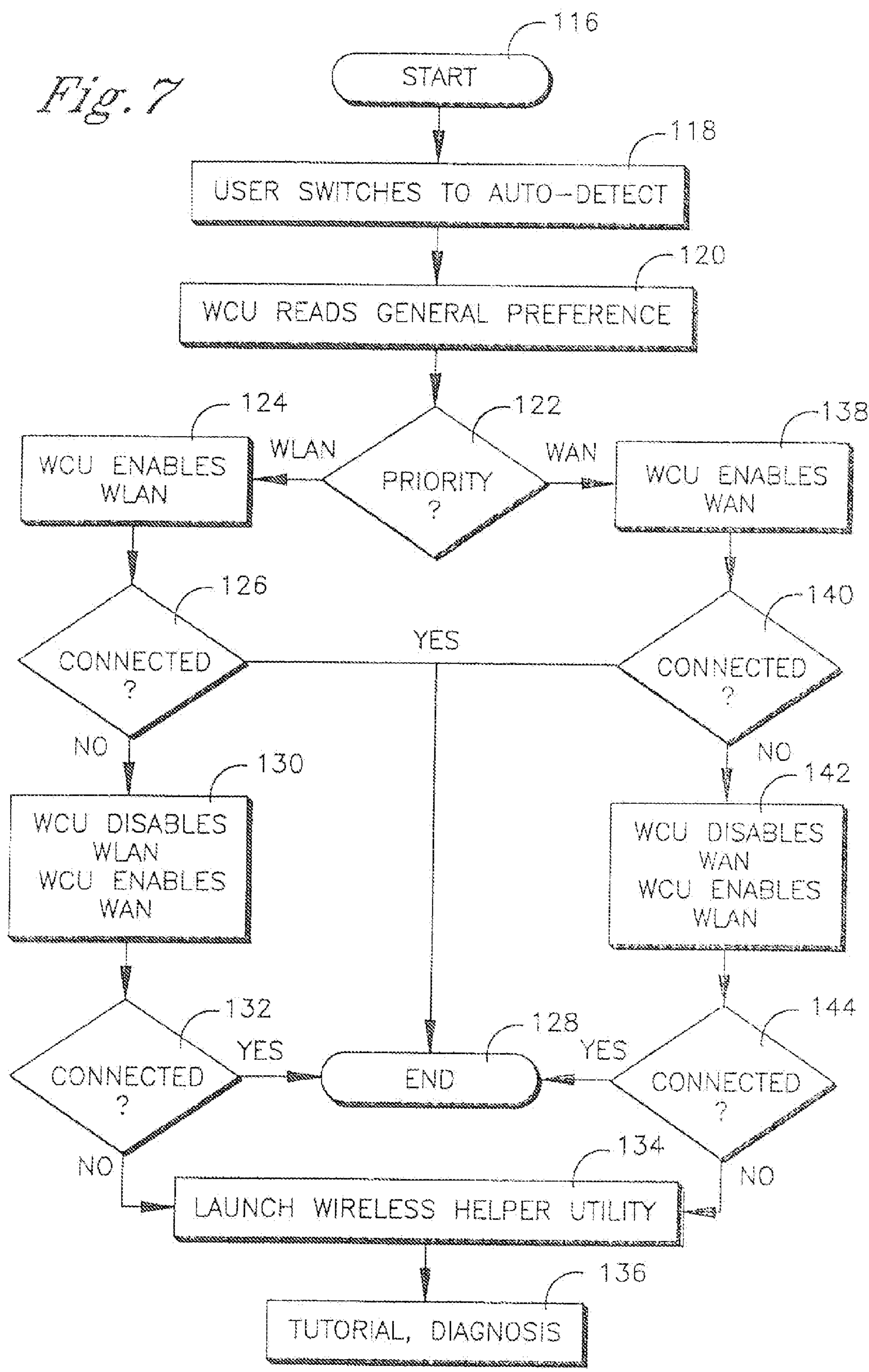
FIG. 7 is a flow chart of the auto-detect logic.

FIGS. 5-7 show various logic that may be implemented by the computer 12 in some embodiments. At block 100 in FIG. 5 the computer 12 is powered on to load the operating system, and at block 102 the operating system, once loaded, notifies the WCU 44 of power on. The WCU 44 in turn enables one or more of the above-described networks at block 104, polling each for status. The respective drivers return the network status to the WCU 44 at block 106. In this way, when, for instance, auto detect is available, the WCU 44 can immediately enable the user-designated preferred network upon power-up or, if it is unavailable, a user-designated alternate network.

FIG. 6 shows "hotspot" logic that can be implemented for localized networks such as Bluetooth, Wi-Fi, and wireless LANs. Commencing at block 108, when a user for the first time enables the WLAN (or Bluetooth), the WCU 44 adds a pre-loaded hotspot profile to the hotspot location list maintained by the WZC 40. When the WLAN subsequently detects that it is in a hotspot at block 110, the WZC 40 connects to the hotspot and notifies the WCU 44 of this at block 112. In response, at block 114 the WCU 44 displays, on the monitor 16, an indication of hotspot availability.

As mentioned above, the WCU 44 can automatically establish communication with a user-preferred network, and one non-limiting logical implementation of this is shown in FIG. 7. Commencing at state 116, the user can select the auto-detect function to be enabled at block 118, in which case the WCU 44 accesses the user-defined preferences at block 120. Decision diamond 122 simply indicates that the WCU 44 ascertains whether the user has selected WAN or WLAN for priority, it being understood that additional user-defined selections could branch from decision diamond 122 accordingly.

When the user has selected WLAN as preferred, the logic moves to block 124 to enable the WLAN components discussed above, and determines at decision diamond 126 whether a connection has been successfully established. If it has, the logic ends at state 128. If the connection has not been successfully established, the logic flows from decision diamond 126 to block 130 to disable WLAN components and enable WAN components. The logic then determines at decision diamond 132 whether a WAN connection has been successfully established. If it has, the logic ends at state 128. If the WAN connection has not been successfully established, the logic flows from decision diamond 132 to block 134 to launch the WHU 60 and initiate help functions such as tutorials and diagnostics at block 136.

When decision diamond 122 indicates that the user has selected WAN as preferred, the logic moves to block 138 to enable the WAN components discussed above, and determines at decision diamond 140 whether a connection has been successfully established. If it has, the logic ends at state 128. If the connection has not been successfully established, the logic flows from decision diamond 140 to block 142 to disable WAN components and enable WLAN components. The logic then determines at decision diamond 144 whether a WLAN connection has been successfully established. If it has, the logic ends at state 128. If the WLAN connection has not been successfully established, the logic flows from decision diamond 144 to block 134 for operation as set forth above.

While the particular SYSTEM AND METHOD FOR MANAGING WIRELESS CONNECTIONS IN COMPUTER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A computer executing a wireless connection utility (WCU), the WCU embodying logic comprising:

accessing at least two of: a wireless local area network (WLAN) driver, a wide area network (WAN) driver, and a Bluetooth driver;

displaying at least one unified user interface (U/I) presenting, in a single screen display, images representing at least two networks selected from: a WLAN, a WAN, and a Bluetooth communication system; and enabling a user to select, by means of the U/I, one or more networks with which to communicate, wherein a general button is presented on a main U/I screen display, the general button being selectable to enable a user to select whether to launch the WCU when an operating system of the computer starts up, wherein the U/I includes the main U/I screen display presenting at least two of: a WAN button selectable to cause WAN settings to appear in a settings window of the main screen display, a WLAN button selectable to cause WLAN settings to appear in the settings window, and a Bluetooth button selectable to cause Bluetooth settings to appear in the settings window, wherein all three buttons are presented on the main U/I screen display, wherein a selector element general button is presented on the main U/I screen display of the computer, the general button selector element being selectable to enable a user to select which of a WLAN or a WAN will have automatic detection priority.

2. The computer of claim 1, wherein the computer is a laptop computer.

3. The computer of claim 1, wherein the U/I includes a one-touch screen display presenting at least two of: a WAN button selectable to switch communications to a WAN, a WLAN button selectable to switch communications to a WLAN, and a Bluetooth button selectable to switch communications to a Bluetooth network.

4. A computer program product bearing instructions executable by a digital processor associated with at least two wireless communication networks selected from a WAN, a WLAN, and a Bluetooth network, comprising:

means for causing a main U/I to appear on a screen associated with the digital processor, the main U/I presenting in a single screen display, computer display elements representing a WLAN, a WAN, and a Bluetooth communication system, the main U/I also presenting a settings window displaying settings associated with at least one of the computer display elements;

a first selector element presented on the main U/I, the first selector element being selectable to enable a user to select which of a WLAN or a WAN will have automatic detection priority, and a second selector element presented on a main U/I screen display, the second selector element being selectable to enable a user to select whether to launch the WCU when an operating system of the computer starts up.

5. The computer program product of claim 4, wherein the digital processor is embodied in a laptop computer.

6. The computer program product of claim 4, wherein the computer display elements are buttons, settings associated with a user-selected button being displayed in the settings window.

7. The computer program product of claim 4, comprising means for displaying a one-touch screen display presenting: a WAN computer display element selectable to switch communications to a WAN, a WLAN computer display element selectable to switch communications to a WLAN, and a Bluetooth computer display element selectable to switch communications to a Bluetooth network.

8. A user interface for a computer having wireless communication capability, comprising:

at least one screen display displaying a WAN computer display element, a WLAN computer display element, and a Bluetooth computer display element, a computer display element being selectable to cause at least one of the following: settings associated with a network represented by the computer display element are displayed in a settings window of the U/I, and communication is automatically switched to a network represented by the computer display element, wherein a first general computer display element is presented for enabling a user to select whether to launch a utility associated with the U/I when an operating system executed by the digital processor starts up, and further wherein a second general computer display element is presented for enabling a user to select which of a WLAN or a WAN will have automatic detection priority.

9. The U/I of claim 8, wherein settings associated with a network represented by the computer display element are displayed in a settings window of the U/I.

10. The U/I of claim 8, wherein communication is automatically switched to a network represented by the computer display element.

11. The U/I of claim 8, wherein the computer is a laptop computer.

12. The U/I of claim 8, wherein the computer display elements are buttons.

* * * * *